Oct. 27, 1959 W. ZIFFER 2,909,942
METHOD OF AND APPARATUS FOR TORQUE TRANSMISSION
Filed April 25, 1955 2 Sheets-Sheet 1

INVENTOR
Walter Ziffer
by Christy, Parmelee and Strickland
his attorneys

Oct. 27, 1959 W. ZIFFER 2,909,942
METHOD OF AND APPARATUS FOR TORQUE TRANSMISSION
Filed April 25, 1955 2 Sheets-Sheet 2
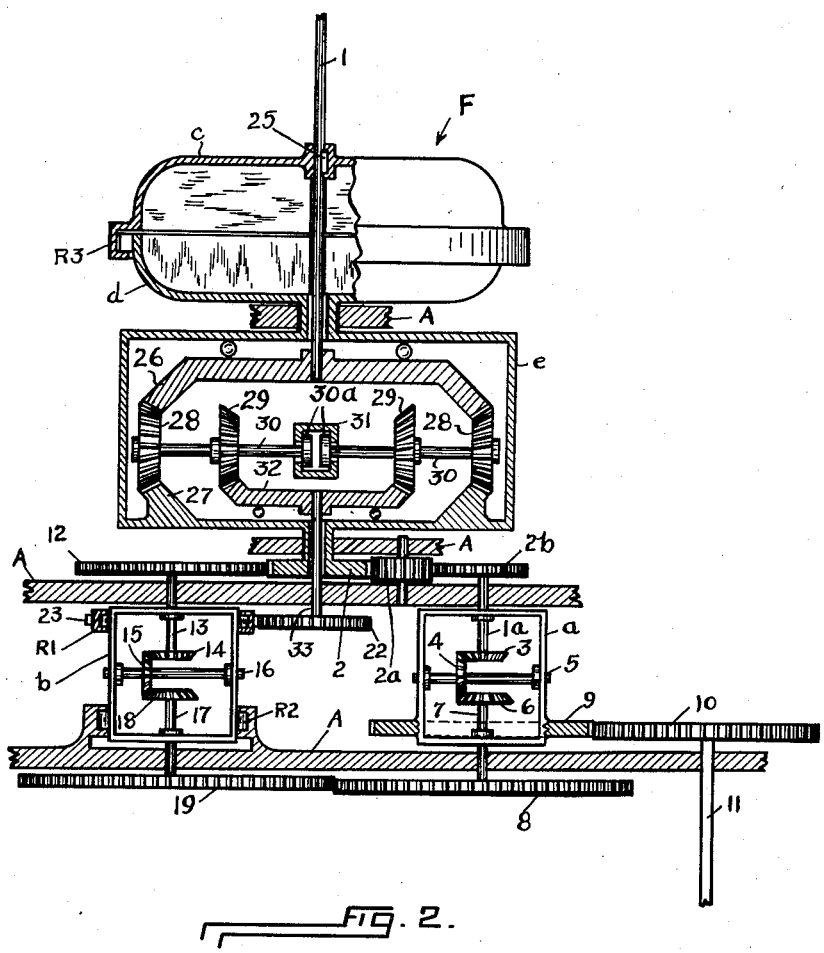
INVENTOR
Walter Ziffer United States Patent Office 2,909,942
Patented Oct. 27, 1959

2,909,942

METHOD OF AND APPARATUS FOR TORQUE TRANSMISSION

Walter Ziffer, Clairton, Pa., assignor of one-twentieth to William S. Weddell, Pittsburgh, Pa.

Application April 25, 1955, Serial No. 503,603

16 Claims. (Cl. 74—677)

My invention relates to the transmission of mechanical power in such way that the torque delivered by a drive shaft to a driven shaft is automatically regulated in response to variations in the load on the driven shaft. The invention consists in certain new and useful improvements both in apparatus and in method.

The invention is particularly, though not exclusively, designed for the transmissions of automobiles. The art is familiar with modern automobiles, in which the clutch between the drive shaft and driven shaft comprises a hydraulic clutch, a so-called fluid drive, which includes a vaned impeller secured to the drive shaft of the car motor, and a vaned "runner" or rotor connected through a transmission to the driven shaft. When the drive shaft and the impeller rotate, a body of liquid confined within the assembled structure reacts under the propulsion of the impeller vanes against the vanes of the "runner" and imparts torque through the transmission to the driven shaft.

The driven shaft imparts rotation to the differential gears which are directly connected to the axles of the traction wheels of the car. The gears in the transmission are adapted to be shifted by means of a mechanism manipulated by the car operator, whereby the transmission may be set in "low," or "second," or "high," or "reverse," as will be readily understood by the motoring public today, and will be more readily understood by those skilled in the art.

Upon the advent in recent years of the hydraulic clutch or fluid drive, it has become feasible to operate automobiles for normal driving through traffic and on the open highway with merely the "low" and "high" adjustments of the transmission, and in consequence automatic gear-shifting transmissions have been developed. The car operator merely sets the gear-shifting mechanism in "drive" position, with the result that the car may be operated for normal driving by the manipulation of only the accelerator and the brake pedal. The gear system in the transmission automatically shifts between "low" and "high," as required when starting, stopping, and traveling. Of course, when it becomes necessary, on occasion, to use the "manual low" or "reverse" adjustment of the transmission, the same is accomplished by manipulation of the gear-shifting mechanism, but the necessity for such manual shifting of gears arises so infrequently as not to be objectionable. Thus, it will be understood that in the modern automobile the torque ratio between the drive and driven shafts in the transmission gearing is automatically varied between "low" and "high," as the need therefor arises during normal car operation, and it is to be noted that this change involves the unmeshing and meshing of the transmission gears as they are automatically shifted, alternately to provide a step-up and step-down variation in the transmission gear or torque ratio between "low" and "high."

The object of my invention is to provide in combination with a fluid clutching effect a method of automatically varying between two limits in a transmission gear system the torque ratio between a drive shaft and a driven shaft in response to variations in the load on the driven shaft.

It is also my object to provide in combination with a fluid drive or clutch a mechanism power transmission having a system of gears that operate automatically between given limits to vary infinitely the speed ratio between a drive shaft and a driven shaft in accordance with variations in load on the driven shaft.

It is understood that others before me have endeavored to achieve the new and useful results to which my invention is directed, but so far as I am aware complete success has not been hitherto attained. In some instances the failure has arisen through a misconception of the effect of the fluid clutch, with which a system of transmission gears was combined.

The variations in the relative speeds of the drive shaft and driven shaft, caused by a corresponding variation in the slippage between the impeller and the "runner" of the hydraulic clutch, has been hitherto believed to provide the desired infinitely variable torque ratio in the transmission system of the car, but such is not the fact. For example, consider that the drive shaft is rigidly connected to the impeller of the clutch, and assume that the driven shaft is similarly connected to the "runner" of the clutch. It has been understood that the amount of torque imparted to the driven shaft increases as the slippage between the impeller and "runner" increases, but the fact remains that, in accordance with Newton's laws, action and reaction are equal and opposite, wherefore the action of the liquid in the clutch on the "runner" is equal and opposite to the reaction on the impeller. The torque ratio between the impeller and "runner" always remains at 1:1, although the torque transmitted to "runner" and the driven shaft is increased and decreased as the slippage increases and decreases.

In accordance with my invention, I provide in combination with a fluid clutching effect a feed-back reaction between the driven shaft and the drive shaft, whereby within certain limits a variation in torque ratio is obtained in response to variations in the load on the driven shaft. Expressed in the terms of apparatus, my invention consists in the combination with a fluid clutch of a main driving gear train for transmitting the torque imparted upon the clutch "runner" to the driven shaft, together with an auxiliary gear train connecting the clutch impeller to a torque-ratio-varying device included in the main gear train. Advantageously, the torque-ratio-varying device comprises a planetary gear unit, and the auxiliary gear train comprises a planetary gear system.

A presently preferred embodiment of the invention is illustrated in the accompanying drawings, in which:

Fig. 2 is a view similar to Fig. 1, showing additionally the auxiliary gear train and hydraulic clutch in an assembly, in which and in the operation of which my invention is realized;

Figure 1:
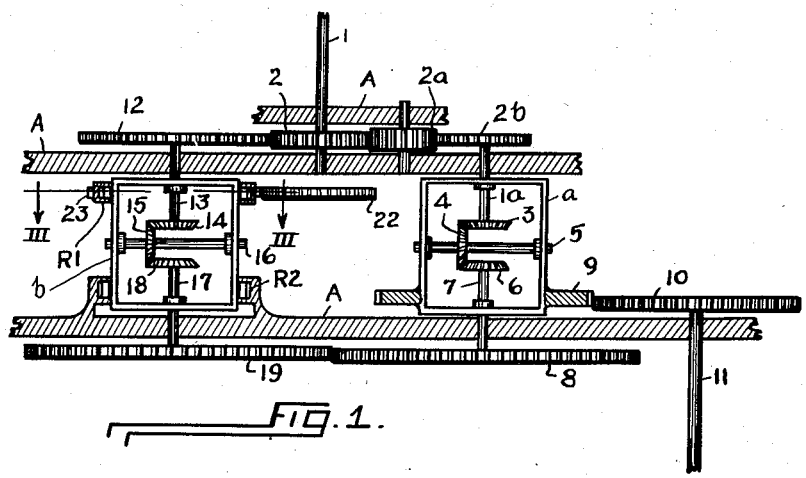
Fig. 1 is a diagrammatic view, showing the main driving gear train in elevation, and portions of the stationary support or frame structure in cross section.

Referring to Fig. 1 of the drawings, for simplicity of description and understanding of the main gear train of the apparatus, the hydraulic clutch or fluid drive has been omitted, and the shaft 1 has been shown connected directly to the train. The portions A shown cross-hatched will be understood to comprise the stationary supporting frame structure for the transmission.

On the drive shaft 1 a driving pinion 2 is secured. The pinion 2 meshes with an idler gear 2a, which in turn meshes with a gear 2b that is of the same diameter as gear 2 and is fixed upon a shaft 1a. The shaft 1a extends into a rotary support or supporting housing or cage a of a set of planetary gears 3, 4 and 6. Due to the arrangement of idler gear 2a and gear 2b between gear 2 and shaft 1a, the shaft 1a is positively driven at the same speed and in the same direction as drive shaft 1, whereby the effect is the same as though the shaft 1 were aligned and integral with shaft 1a.

The set of planetary gears 3, 4 and 6 may be bevel gears, as shown. The gear 3 is (with respect to this set of planetary gears) a drive gear which is fixed on shaft 1a and meshes with bevel planetary gear 4 which is mounted on a transverse axle 5 carried by the wall of housing a. The gear 4 meshes with the gear 6 which is a driven gear in the set and is fixed on a shaft 7 that extends outwardly from the housing to a gear 8 that is also united to the shaft 7. The shaft 7 is aligned with shaft 1a, and the housing a (within the limitations presently to appear) is rotatable on the axis defined by the aligned shafts 1a and 7. A pinion 9 is formed on, or is rigidly carried by, the wall of the rotary housing a, and this pinion meshes with a gear 10 on a shaft 11. The shaft 11 may be understood to be the driven shaft; that is, the shaft which is connected through the usual "differential" gears to the rear axles and wheels of a motor car.

The pinion 2 on the drive shaft 1 also meshes with a gear 12 on a shaft 13 that extends into a rotary gear cage or housing b of a second set of planetary gears, and therein a bevel drive gear 14 on such shaft 13 meshes with a bevel planetary gear 15 on a cross shaft 16 carried by the wall of said housing b. A shaft 17, having a bevel driven gear 18 in mesh with gear 15, extends outwardly from the housing and carries a gear 19 that meshes with gear 8.

The gear 12 in this case has twice the diameter of the driving pinion 2, wherefore the shaft 13 leading into housing b is rotated at one-half the speed of the drive shaft 1 and in opposite direction thereto. For the moment let it be understood that the housing b is secured against rotation in the stationary supporting frame A, and that the gear 12 rotates at one-half the r.p.m. of pinion 2 and drive shaft 1, and in opposite direction thereto. The gear 19 is driven in the same direction as the gear 2 and drive shaft 1, and at one-half the r.p.m. thereof. The gear 8 is of the same diameter as gear 19 and is driven in opposite direction thereto and to the drive shaft 1. Due to the differential gears 3, 4, 6, and to the relative speeds and directions of rotation of the shafts 1a and 7, the housing a is rotated at one-quarter of the r.p.m. of the drive shaft 1 and in the same direction. The pinion 9 on the wall of the housing a is of the same size as the gear 10, wherefore the driven shaft 11 is rotated at the same speed as the housing a, and in opposite direction thereto and to the drive shaft 1. The speed of the driven shaft is one-fourth that of the drive shaft. In other words, disregarding friction in the gear-train, the torque of the driven shaft 11 is four times the torque of the drive shaft 1.

Figure 4:
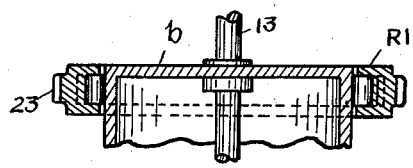
Fig. 4 is a fragmentary view in section, as seen on the plane IV—IV of Fig. 3.
Figure 3:
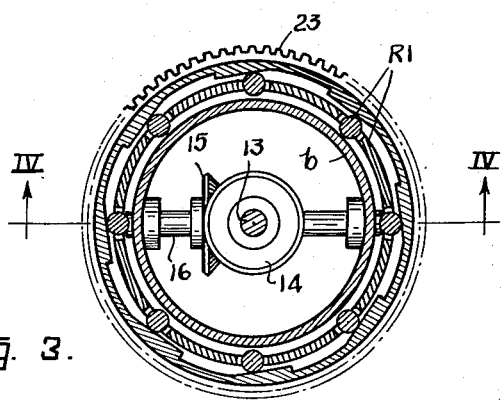
Fig. 3 is a view in cross section, and to larger scale, of a certain planetary gear housing of my transmission, the view being taken on the plane III—III of Fig. 1, and illustrating a roller ratchet device included in the structure.

Thus, with the housing b secured against rotation, the fixed torque ratio between the drive shaft 1 and driven shaft 11 is 1:4. If, however, the housing b is rotated at the same speed as, but in opposite direction to the drive shaft 1, the speed of the driven shaft 11 is now 5/4 (1.25) the speed of the drive shaft. At various speeds of the housing b between zero speed (as first described) and a speed which is equal (and opposite in direction) to that of the drive shaft 1, the speed ratio between the drive shaft 1 and the driven shaft 11 varies from 4:1 to 0.8:1. For maximum load on the driven shaft the rotary speed of housing b should be zero, to develop minimum speed in said driven shaft, while at zero load on the driven shaft 11 the speed of rotation of the housing b should be maximum. To provide for a continuous variation of the speed ratio between the two limits 4:1 and 0.8:1, the housing b is rotated in a direction opposite to that of the drive shaft and at a speed in substantially inverse proportion to the load on the driven shaft. For such purpose a ring gear 23 may be mounted on the wall of housing b to mesh with a gear 22, and by means of an auxiliary gear train or planetary gear system, presently to be described in combination with a hydraulic clutch, the gear 22 is rotated in the same direction as the drive shaft 1 and at a speed in substantially inverse proportion to the load on the driven shaft 11. A roller ratchet $R^1$, shown in Figs. 2 and 4, is arranged to lock the ring gear 23 to the housing b when the gear 22 rotates in the same direction as drive shaft 1, so that the housing b may be driven by the gear 22 in opposite direction to the drive shaft 1, as noted. A roller ratchet $R^2$ is provided to prevent rotation of housing b in the same direction as drive shaft 1, and if and when the auxiliary gear system rotates the gear 22 in opposite direction to the drive shaft 1 the ratchet $R^1$ permits the ring gear 23 to turn freely on the housing b, which housing is locked from turning at this time by the ratchet $R^2$. At this point all the torque acting on housing b is taken up by device $R^2$ and through it by the mass of the suspension, or stationary parts A. The torque ratio between the drive and driven shafts is then inversely proportional to the ratio of the respective speeds. If housing b is rotated, the torque previously balanced by the suspension mass has to be supplied through gear 22 and device $R^1$. If this torque is supplied by the drive shaft 1, it will add to the torque supplied by the drive shaft to balance the load when housing b is at rest. It will be understood, therefore, that by rotating the gear 22 in the same direction as the drive shaft 1 and at a speed controlled by the load on the driven shaft 11, the torque ratio of the main gear train shown in Fig. 1 may be varied between two torque ratio limits, the torque ratio limits in the exemplary gear train illustrated being 1:4 and 1:0.8.

Referring to Fig. 2, the auxiliary gear train or feedback planetary system is provided within a rotary housing e and is cooperatively combined with the impeller c and "runner" d of a hydraulic clutch or fluid drive F.

The "runner" d of the fluid clutch is rigidly connected to or integral with the housing e, and this housing, rotated by the reaction of the fluid between the impeller c and "runner" d, drives the gear 2, which in turn drives the gears 2a, 2b, and 12 after the manner set forth in the description of Fig. 1.

More particularly, the drive shaft 1, extending from the automobile engine, is rigidly connected, as by a key 25, to the impeller c. The drive shaft 1 is extended freely through the "runner" d and carries or is connected to a primary gear of the planetary gear system, such as the bevel gear 26. As already mentioned, the "runner" d is integral with or integrated to the housing e, and by means of such housing the "runner" is rigidly connected to the gear 2, which transmits the torque of the "runner" to the main gear train of the transmission. A secondary gear of the planetary system, such as the bevel gear 27, is rigidly united to the housing e, the gear 27 being an exact counterpart of bevel gear 26 and axially aligned therewith. A pair of oppositely positioned bevel pinions 28 intermesh with the gears 26 and 27, whereby any slippage between the impeller and "runner" of the fluid drive, caused by load imposed on the driven shaft 11, will result in the rotation of the pinions 28, and in the rotation of bevel pinions 29 that are paired one with each pinion 28 on a shaft 30. The pinions 28, 29 of each pair are rigid with their supporting shaft 30, and the two shafts 30 are axially aligned, having integral on their inner ends heads 30a embraced by a stirrup 31 that permits the shafts freely to rotate with their bevel pinions, while holding such pinions in mesh with the impeller gear 26 and the "runner" gear 27.

Bevel pinions 29 mesh with a gear 32 rigidly secured on a shaft 33 that carries the gear 22. The gear 32 is of smaller diameter and has fewer teeth than the gear 27, the gear ratio in this case being 1:2. The relative size of these gears is immaterial when the load is theoretically zero and theoretically there is no slippage in the fluid drive. Thus, assuming that there is no slippage in the fluid drive, the gears 26 and 27 rotate at the same speed, and the bevel pinions 28 and 29, while not rotating on their axes, revolve about the common geometrical axis of the gears 26 and 27, and the feed-back gears 32 and 22 are rotated. The gear 22 imparts to housing $b$, through roller ratchet $R^1$, the full speed of the drive shaft 1, but in the opposite direction of rotation. Under these conditions the transmission is geared in "high," with a torque ratio in the gear system of 1:0.8. When there is slippage between the impeller and the "runner" of the fluid drive F, the gear 26 rotates faster than gear 27, with the effect that gears 32 and 22 are rotated more slowly than when there is no slippage, driving the housing $b$ correspondingly more slowly in a direction opposite to the drive shaft 1, and increasing the speed ratio from 0.8:1 by an amount controlled by the percentage of slippage. It will be understood that the percentage of slippage is equal to the arithmetical difference between the rotary speeds of the impeller and "runner" of the fluid drive divided by the rotary speed of the impeller, while the straight slippage is the said arithmetical difference only. The larger the percentage of slippage is, the slower the housing $b$ will rotate, until the percentage of slippage has increased up to a degree where the gears 32 and 22 stand still, leaving the housing $b$ at rest. The percentage of slippage now remains constant, while the straight slippage and the impeller-speed decrease in equal proportions. During this time device $R^2$ takes up all the torque previously applied to housing $b$ by the impeller. At the end of this process the transmission will be understood to be geared in "low."

Thus it is, that the torque ratio of my transmission is varied in response to variations in the load on the driven shaft.

The percentage of clutch slippage necessary for the housing $b$ to remain at rest is dependent upon the difference in the number of teeth between feed-back gear 32 and gear 27. If the ratio between these two gears is 1:2, as in the exemplary case herein, the necessary slippage for the housing $b$ to come to rest and stand at rest is 66.6%, assuming that bevel pinions 28 and 29 have the same number of teeth. If the gear ratio of gears 32 and 27 is lower than 1:2, a higher slippage is necessary for the housing $b$ to come to rest and stand at rest, at which point the transmission will go into "low." On the other hand, if the gear ratio of gears 32 and 27 is higher than 1:2, it will result in a smaller percentage of slippage being required for the transmission to reach "low." Any slippage greater than the critical degree required for the transmission to reach "low" will, if it were permitted, turn gears 32 and 22 in opposite direction to the drive shaft 1 and such greater-than-critical slippage results in the ratchet $R^1$ releasing the engagement of ring gear 23 with housing $b$, and the ratchet $R^2$ blocking the housing $b$ against rotation in the same direction as the shaft 1. The action of the transmission tends to minimize the slippage in the fluid drive.

The critical slippage between the hydraulically coupled impeller and "runner" of the fluid drive, at which point the gears 32 and 22 stand at rest, determines the amount of load on the driven shaft needed for the transmission to reach "low." Naturally, it will be necessary to keep the critical slippage within the range of economical operation of the fluid drive.

A change in the ratio between gears 32 and 27, together with changes in the relative diameters of gears 2, 12, 19 and 8, will adapt the transmission for any kind of engine and car.

The automobile equipped with my transmission will also have supplemental gearing and operating mechanism for connecting and disconnecting the transmission between the drive shaft of the motor and the driven shaft that leads to the differential gears of the car; that is, for shifting between "drive" position (in which my transmission gear system between the fluid drive and the driven shaft) and "neutral" position (in which there is no driving connection between the car motor and the driven shaft). The manually actuated supplemental gearing will also provide for connecting the motor to the driven shaft in "reverse." This supplemental gearing and the operating mechanism are not matters with which this invention is immediately concerned, wherefore they are not illustrated herein.

A roller ratchet $R^3$ may be installed between impeller $c$ and "runner" $d$ of the fluid drive, thereby preventing the "runner" from over-running the impeller and increasing the gear ratio to "free-wheeling."

The transmission described affords many practical advantages. For example, it is constructed of conventional parts, such as a fluid drive of the simplest kind, in combination with planetary gears and roller ratchets. As already mentioned, an outstanding advantage of the transmission is that the torque ratio between drive shaft and driven shaft is automatically varied in response to the load on the driven shaft, and this variation is achieved without the use of complicated control systems or hydraulic pressure parts, with the exception of the fluid drive itself. Hence, the cost of my transmission is considerably less than the cost of other automatic transmissions. Due to the simplicity of construction, the dependability of operation will be increased, while the change of the torque ratio is smooth and free of jerks.

It will be understood that the embodiment of my invention herein illustrated has been conventionalized for purposes of my present disclosure. Actually, the gears 19 and 8 may be constructed in much smaller diameter and interconnected with a pair of smaller intermediate idler gears, whereby the gears 9 and 10 may be of greatly reduced diameter, and the whole assembly built more compactly.

Needless to say the use of my transmission need not be limited to the automotive field. It may be used in any installation where a motor or prime mover is employed to drive a machine or apparatus that imposes a varying load on the drive. Referring to Fig. 1, it will be understood that, in the case of an apparatus which operates at low r.p.m., the gear 22 may be furnished with a crank mechanism, and such gear may be turned manually at a speed to vary the speed ratio of the transmission train in accordance with variations of the load on the driven shaft. Alternatively, the gear 22 may be connected to an electric motor whose speed is controlled by a rheostat, and an attendant may manually adjust the rheostat, whereby the speed at which gear 22 rotates, and in turn the speed ratio of the transmission train, are regulated in accordance with the load on the driven shaft. In some cases the manually controlled regulation of the speed ratio of the transmission may be practiced when the drive shaft 1 (Fig. 1) is connected through a conventional fluid drive to the prime mover.

Whereas the means for locking the gear 22 to drive the housing or support $b$ in one direction of rotation is shown to be a roller ratchet $R^1$, it will be understood that other known devices may serve in place of the said ratchet, and for the ratchets $R^2$ and $R^3$ as well. A ball ratchet, or a ratchet-and-pawl device, or a friction clutch may be used, for example, in lieu of each roller ratchet.

Within the terms of the appended claims many other modifications and variations can be made in the transmission method and apparatus described, without departing from the spirit of the invention.

I claim:

1. A mechanism for transmitting torque from a drive shaft to a driven shaft comprising an impeller connected to said drive shaft, a "runner" hydraulically coupled to said impeller, a gear train connecting said "runner" to said driven shaft, a set of planetary gears in said gear train for varying the gear ratio of the train in infinite increments over a finite range, said set of planetary gears comprising one gear connected by gears of said train to said "runner," a second gear of the set connected by gears of said train to said driven shaft, and a third gear intermeshing with the first and second gears of the set, a rotary support in which the said third gear of the set is mounted for planetary motion, and means for rotating said support at a speed proportional to the load on said driven shaft, said means including an impeller gear connected to rotate in unison with said impeller, a "runner" gear connected to rotate in unison with said "runner," a feed-back gear connected to said gear train, and planetary gears interconnecting said impeller, "runner," and feed-back gears for rotating the feed-back gear at a speed proportional to the slippage between said hydraulically coupled impeller and "runner."

2. A mechanism for transmitting torque from a drive shaft to a driven shaft comprising an impeller connected to said drive shaft, a "runner" hydraulically coupled to said impeller, a gear train connecting said "runner" to said driven shaft, a set of planetary gears in said gear train for varying the gear ratio of the train in infinite increments over a finite range, said set of planetary gears comprising one gear connected by gears of said train to said "runner," a second gear of the set connected by gears of said train to said driven shaft, and a third gear intermeshing with the first and second gears of the set, a rotary support in which the said third gear of the set is mounted for planetary motion, the gears connecting said second gear of said set of planetary gears to said driven shaft including a second set of planetary gears having one gear connected to said drive shaft, a second gear of said second set geared to said second gear of the first set of planetary gears, and a third gear intermeshing with the first and second gears of said second set, a rotary support in which the third gear of said second set is mounted for planetary motion, means for gearing the latter support to said driven shaft, and means for rotating the support of the first set of planetary gears at a speed proportional to the load on the driven shaft.

3. A mechanism for transmitting torque from a drive shaft to a driven shaft comprising an impeller connected to said drive shaft, a "runner" hydraulically coupled to said impeller, a gear train connecting said "runner" to said driven shaft, a set of planetary gears in said gear train for varying the gear ratio of the train in infinite increments over a finite range, said set of planetary gears comprising one gear connected by gears of said train to said "runner," a second gear of the set connected by gears of said train to said driven shaft, and a third gear intermeshing with the first and second gears of the set, a rotary support in which the said third gear of the set is mounted for planetary motion, the gears connecting said second gear of said set of planetary gears to said driven shaft including a second set of planetary gears having one gear connected by gears of said train to said "runner," a second gear of said second set geared to said second gear of the first set of planetary gears, and a third gear intermeshing with the first and second gears of said second set, a rotary support in which the third gear of said second set is mounted for planetary motion, means for gearing said second rotary support to said driven shaft, and means for rotating the support of the first set of planetary gears at a speed proportional to the load on the driven shaft, said means including an impeller gear connected to rotate in unison with said impeller, a "runner" gear connected to rotate in unison with said "runner," a feed-back gear connected to said gear train, and planetary gears interconnecting said impeller, "runner," and feed-back gears for rotating the feed-back gear at a speed proportional to the slippage between said hydraulically coupled impeller and "runner."

4. An incrementally variable-torque mechanism for transmitting torque from a drive shaft to a driven shaft comprising an impeller connected to said drive shaft, a "runner" hydraulically coupled to said impeller, a gear train connecting said "runner" to said driven shaft, and means included in the gear train between the "runner" and the driven shaft for interconnecting said impeller and "runner," said means comprising a primary gear connected to rotate in unison with said impeller, a secondary gear connected to rotate in unison with said "runner," and means including a feed-back gear interconnected with said primary and secondary gears and operative in response to the percentage of slippage therebetween for incrementally varying the torque ratio of said train in relation to variations in the load on the driven shaft.

5. An incrementally variable-torque mechanism for transmitting torque from a drive shaft to a driven shaft comprising an impeller connected to said drive shaft, a "runner" hydraulically coupled to said impeller, a gear train connecting said "runner" to said driven shaft, and means comprising a planetary gear system included in the gear train between the "runner" and the driven shaft for interconnecting said impeller and "runner," said planetary gear system comprising a primary gear connected to rotate in unison with said impeller, a secondary gear connected to rotate in unison with said "runner," and means including a feed-back gear interconnected with said primary and secondary gears and operative in response to the percentage of slippage therebetween for incrementally varying the torque ratio of said train in relation to variations in the load on the driven shaft.

6. A variable-torque transmission mechanism for transmitting torque from a drive shaft to a driven shaft comprising an impeller connected to said drive shaft, a "runner" hydraulically coupled to said impeller, a gear train connecting said "runner" to said driven shaft, and means interconnecting said impeller and "runner" and operative in response to the percentage of slippage therebetween for controlling the torque ratio of said train in relation to variations in the load on the driven shaft, said means including a primary bevel gear connected to rotate in unison with said impeller, a secondary bevel gear connected to rotate in unison with said "runner," a feed-back bevel gear in said gear train mounted between and on common axis with said primary and secondary bevel gears, and planetary bevel gears interconnecting said primary, secondary and fed-back gears for rotating the feed-back gear at a speed controlled by the slippage between said hydraulically coupled impeller and "runner."

7. A variable-torque transmission mechanism for transmitting torque from a drive shaft to a driven shaft comprising an impeller connected to said drive shaft, a "runner" hydraulically coupled to said impeller, a gear train connecting said "runner" to said driven shaft, a set of planetary gears in said gear train for varying the torque ratio of the train, said set of planetary gears comprising one gear connected by gears of said train to said "runner," a second gear of the set connected by gears of said train to said driven shaft, and a third gear intermeshing with the first and second gears of the set, a rotary support in which the said third gear of the set is mounted for planetary motion, and means geared to the support for rotating said support at a speed controlled by the percentage of slippage between said hydraulically coupled impeller and "runner."

8. A variable torque transmission comprising two planetary gear sets, each set having a drive gear, a driven gear, a planetary gear intermeshed with said drive and driven gears, and a rotary support bearing the latter gear for planetary motion, a powerfully rotated driving pinion, means interconnecting the drive gears of the two planetary gears sets to the driving pinion for rotation at unequal speeds, means interconnecting the driven gears of the two planetary gear sets for rotation in unison, a driven shaft geared to the rotary support of one of said planetary gear sets, and means for varying the speed of rotation of the support of the other planetary gear set in accordance with the variations in load on the said driven shaft.

9. A variable torque transmission comprising a drive shaft, a planetary gear system having a primary gear and a secondary gear, an impeller connected to said drive shaft and to the primary gear of said system, a "runner" hydraulically coupled to said impeller, a powerfully rotated driving-pinion, the secondary gear of said planetary system and said powerfully rotated driving pinion being connected to said "runner," planetary gears intermeshed with said primary and secondary gears of the planetary system, a driven shaft, a gear-train interconnecting said driving pinion and the driven shaft, a feed-back gear in said planetary system geared to said planetary gears, and means for rotating said feed-back gear at a speed varying in accordance with variations in the load on said driven shaft.

10. A variable torque transmission comprising a drive shaft, a planetary gear system having a primary gear and a secondary gear, an impeller connected to said drive shaft and to the primary gear of said system, a "runner" hydraulically coupled to said impeller, a powerfully rotated driving pinion, the secondary gear of said planetary system and the powerfully rotated driving pinion being connected to said "runner," planetary gears intermeshed with said primary and secondary gears of the planetary system, a feed-back gear in said planetary system geared to said planetary gears, a driven shaft, a gear-train connecting said driving pinion to said driven shaft, said gear-train including a planetary gear set having a drive gear and a driven gear intermeshed by a planetary gear borne in a support rotatably mounted to give planetary motion to the last-mentioned gear, said support being geared to said driven shaft, and means geared to said planetary gear set for rotating said feed-back gear at a speed varying in accordance with variations in the load on said driven shaft.

11. A variable torque transmission comprising a drive shaft, a planetary gear system having a primary gear and a secondary gear, an impeller connected to said drive shaft and to the primary gear of said system, a "runner" hydraulically coupled to said impeller, a powerfully rotated driving pinion, the secondary gear of said planetary system and said driving pinion being connected to said "runner," planetary gears intermeshed with said primary and secondary gears of the planetary system, a feed-back gear in said planetary system geared to said planetary gears, a driven shaft, a gear-train connecting said driving pinion with said driven shaft, said gear-train including two planetary gear sets each having a drive gear, a driven gear, a planetary gear intermeshed with said drive and driven gears, and a rotary support bearing the latter gear for planetary motion, means interconnecting the drive gears of the two planetary gear sets to said driving pinion for rotation, means interconnecting the driven gears of the two planetary gear sets for rotation in unison, said driven shaft being geared to the rotary support of one of said planetary gear sets, and means for gearing the support of the second planetary gear set to said feed-back gear, whereby the torque ratio of said transmission is varied in response to the percentage of slippage between said hydraulically coupled impeller and "runner."

12. A variable torque transmission comprising a drive shaft, a planetary gear system having a primary gear and a secondary gear, an impeller connected to said drive shaft and to the primary gear of said system, a "runner" hydraulically coupled to said impeller, a powerfully rotated driving pinion, the secondary gear of said planetary system and said driving pinion being connected to said "runner," planetary gears intermeshed with said primary and secondary gears of the planetary system, a feed-back gear in said planetary system geared to said planetary gears, a driven shaft, a gear-train connecting said driving pinion with said driven shaft, said gear-train including two planetary gear sets each having a drive gear, a driven gear, a planetary gear intermeshed with said drive and driven gears, and a rotary support bearing the latter gear for planetary motion, means interconnecting the drive gears of the two planetary gear sets to said driving pinion for rotation, means interconnecting the driven gears of the two planetary gear sets for rotation in unison, said driven shaft being geared to the rotary support of one of said planetary gear sets, and means for gearing the support of the second planetary gear set to said feed-back gear, said gearing means including a ratchet device ($R^1$) whereby the rotation transmitted between said feed-back gear and the rotary support of the second planetary support is effective in only one direction of rotation of such support.

13. A mechanism for transmitting torque from a drive shaft to a driven shaft comprising an impeller connected to said drive shaft, a "runner" hydraulically coupled to said impeller, a gear train connecting said "runner" to said driven shaft, and means including a planetary gear system interconnecting said impeller and "runner" and operative in response to the percentage of slippage therebetween for varying the torque ratio of said train in relation to variations in the load on the driven shaft, said planetary gear system having a feed-back gear, a set of gears interconnecting said feed-back gear with said driven shaft, a stationary frame, and a housing mounted for rotation in said frame, said housing supporting a gear of said set for rotation relatively to the housing, together with a ratchet device effective between the latter gear and the housing for the transmission of rotative stress between said gear and housing in one direction.

14. A mechanism for transmitting torque from a drive shaft to a driven shaft comprising an impeller connected to said drive shaft, a "runner" hydraulically coupled to said impeller, a gear train connecting said "runner" to said driven shaft, and means including a planetary gear system interconnecting said impeller and "runner" and operative in response to the percentage of slippage therebetween for varying the torque ratio of said train in rotation to variations in the load on the driven shaft, said planetary gear system having a feed-back gear, a set of gears interconnecting said feed-back gear with said driven shaft, a stationary frame, and a housing mounted for rotation in said frame, said housing supporting a gear of said set for rotation relatively to the housing, together with a ratchet device effective between the latter gear and the housing for the transmission of rotative stress between said gear and housing in one direction, and a ratchet device effective between said housing and frame for limiting the housing to rotation in one direction.

15. A mechanism for transmitting torque from a drive shaft to a driven shaft comprising an impeller connected to said drive shaft, a "runner" hydraulically coupled to said impeller, a gear train connecting said "runner" to said driven shaft, and means including a planetary gear system interconnecting said impeller and "runner" and operative in response to the percentage of slippage therebetween for varying the torque ratio of said train in relation to variations in the load on the driven shaft, said planetary gear system having a feed-back gear, a ratchet device effective between the impeller and "runner" to prevent said "runner" from over-running the impeller, a set of gears interconnecting said feed-back gear with said driven shaft, a stationary frame, and a housing mounted for rotation in said frame, said housing supporting a gear of said set for rotation relatively to the housing, together with a ratchet device effective between the latter gear and the housing for the transmission of rotative stress between said gear and housing in one direction, and a ratchet device effective between said housing and frame for limiting the housing to rotation in one direction.

16. In a variable-torque transmission which includes a driven impeller hydraulically coupled to a "runner" that is connected through a system of gears to a variably loaded driven shaft, with provision for slippage between said impeller and "runner"; the method which comprises imposing a driving torque on said impeller and transmitting such torque hydraulically to said "runner" while varying the percentage of slippage between the impeller and "runner" in accordance with the variations in the load on said driven shaft and the accompanying variations in the torque reacting hydraulically on said impeller, and while maintaining the gears of said system in uninterrupted effective engagement continuously and incrementally varying the torque ratio of said gear system in accordance with variations in said percentage of slippage.

References Cited in the file of this patent

UNITED STATES PATENTS

| | | |
|---|---|---|
| 2,283,486 | Berry | May 19, 1942 |
| 2,480,032 | Kochis | Aug. 23, 1949 |
| 2,543,878 | Stewart | Mar. 6, 1951 |
| 2,641,142 | Klepetko | June 9, 1953 |
| 2,651,948 | Price | Sept. 15, 1953 |
| 2,718,796 | Gautier | Sept. 27, 1955 |
| 2,749,775 | Simpson | June 12, 1956 |
| 2,792,722 | Stefan | May 21, 1957 |